United States Patent [19]
Fujii

[11] Patent Number: 5,818,811
[45] Date of Patent: *Oct. 6, 1998

[54] INFORMATION RECORDING AND REPRODUCING METHOD FOR RECORDING INFORMATION ON AND REPRODUCING INFORMATION FROM AN OPTICAL RECORDING MEDIUM INCLUDING A LAND PORTION DIVIDED INTO A PLURALITY OF INFORMATION TRACKS

[75] Inventor: Eiichi Fujii, Kamakura, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 525,096

[22] Filed: Sep. 8, 1995

[51] Int. Cl.$^6$ .................................................. G11B 7/00
[52] U.S. Cl. .......................................... 369/275.4; 369/13
[58] Field of Search .................................... 369/112, 109, 369/30, 13, 111, 93, 97, 124, 275.1, 275.3, 275.4, 44.28

[56] References Cited

U.S. PATENT DOCUMENTS

| | | | |
|---|---|---|---|
| 5,132,945 | 7/1992 | Osato et al. | 369/13 |
| 5,153,873 | 10/1992 | Spruit et al. | 369/109 X |

FOREIGN PATENT DOCUMENTS

| | | |
|---|---|---|
| 0343727 | 11/1989 | European Pat. Off. . |
| 0451297 | 10/1991 | European Pat. Off. . |
| 0525192 | 2/1993 | European Pat. Off. . |
| 0608134 | 7/1994 | European Pat. Off. . |
| 3-93058 | 4/1991 | Japan . |
| 4-255946 | 9/1992 | Japan . |
| 6-124500 | 5/1994 | Japan . |

OTHER PUBLICATIONS

Patent Abstracts of Japan, vol. 12, No. 68, published Mar. 3, 1988 English Abstract of Japanese Patent No. 62–208445.

Patent Abstracts of Japan, vol. 9, No. 37, published Feb. 16, 1985 English Abstract of Japanese Patent No. 59–178640.

Patent Abstracts of Japan vol. 17, No. 471, published Aug. 26, 1993 English Atstract of Japanese Patent No. 5–109120.

Patent Abstracts of Japan, vol. 17, No. 254, published May 19, 1993 English Abstract of Japanese Patent No. 4–370541.

Patent Abstracts of Japan, vol. 16, No. 361, published Aug. 5, 1992 English Abstracts of Japanese Patent No. 4–111236.

Patent Abstracts of Japan, vol. 16, No. 361, published Aug. 5, 1992 English Abstract of Japanese Patent No. 4–111235.

Patent Abstracts of Japan, vol. 16, No. 125, published Mar. 30, 1992 English Abstract of Japanese Patent No. 3–290842.

*Primary Examiner*—Paul W. Huber
*Attorney, Agent, or Firm*—Fitzpatrick, Cella, Harper & Scinto

[57] ABSTRACT

An optical recording medium including a substrate formed with a groove portion and a land portion, and a magnetic layer laminated on the substrate, the width of the land portion and the width of the groove portion differing from each other. In the recording medium, the land portion of the recording medium is divided into a plurality of information tracks, and the recording of the information is independently effected on the respective information tracks. In reproduction of information from the recording medium by the use of a super-resolving technique, the reproduction of the information is independently effected from the respective information tracks.

2 Claims, 11 Drawing Sheets

INFORMATION RECORDING AND REPRODUCING METHOD FOR RECORDING INFORMATION ON AND REPRODUCING INFORMATION FROM AN OPTICAL RECORDING MEDIUM INCLUDING A LAND PORTION DIVIDED INTO A PLURALITY OF INFORMATION TRACKS

BACKGROUND OF THE INVENTION

1. Field of the Invention

This invention relates to an optical recording medium on which recording and reproduction of information are effected by use of a super-resolving technique, and a method of recording and reproducing on the medium.

2. Related Background Art

As optical memories for recording information by applying a light beam thereto, and for reproducing information by detecting reflected light therefrom, there are known various optical memories such as an optical memory of the ROM type which records information by a phase pit, an optical memory of the write once type which forms holes in a recording film by application of a light beam to thereby record information, an optical memory of the phase variation type which varies the crystal phase of a recording film by application of a light beam to thereby effect recording, and a magneto-optical memory which varies the direction of magnetization of a recording layer by application of a light beam and application of a magnetic field to thereby effect recording. In such optical memories, it may be said that the reproduction resolving power of a signal is determined almost exclusively by the wavelength of reproducing light λ and the numerical aperture (N.A.) of an objective lens, and the pit period of the detection limit is approximately λ/(2·N.A.) and the recording density of information is determined by these factors. However, it is not easy to shorten the wave-length of the reproducing light or to increase the numerical aperture of the objective lens and therefore, an attempt has been made to contrive a recording medium and a reproducing method to thereby increase the recording density of information. For example, there has been proposed a super-resolution reproducing technique of improving reproduction resolving power beyond the detection limit determined by the wavelength and the numerical aperture of the objective lens.

Figure 1A:
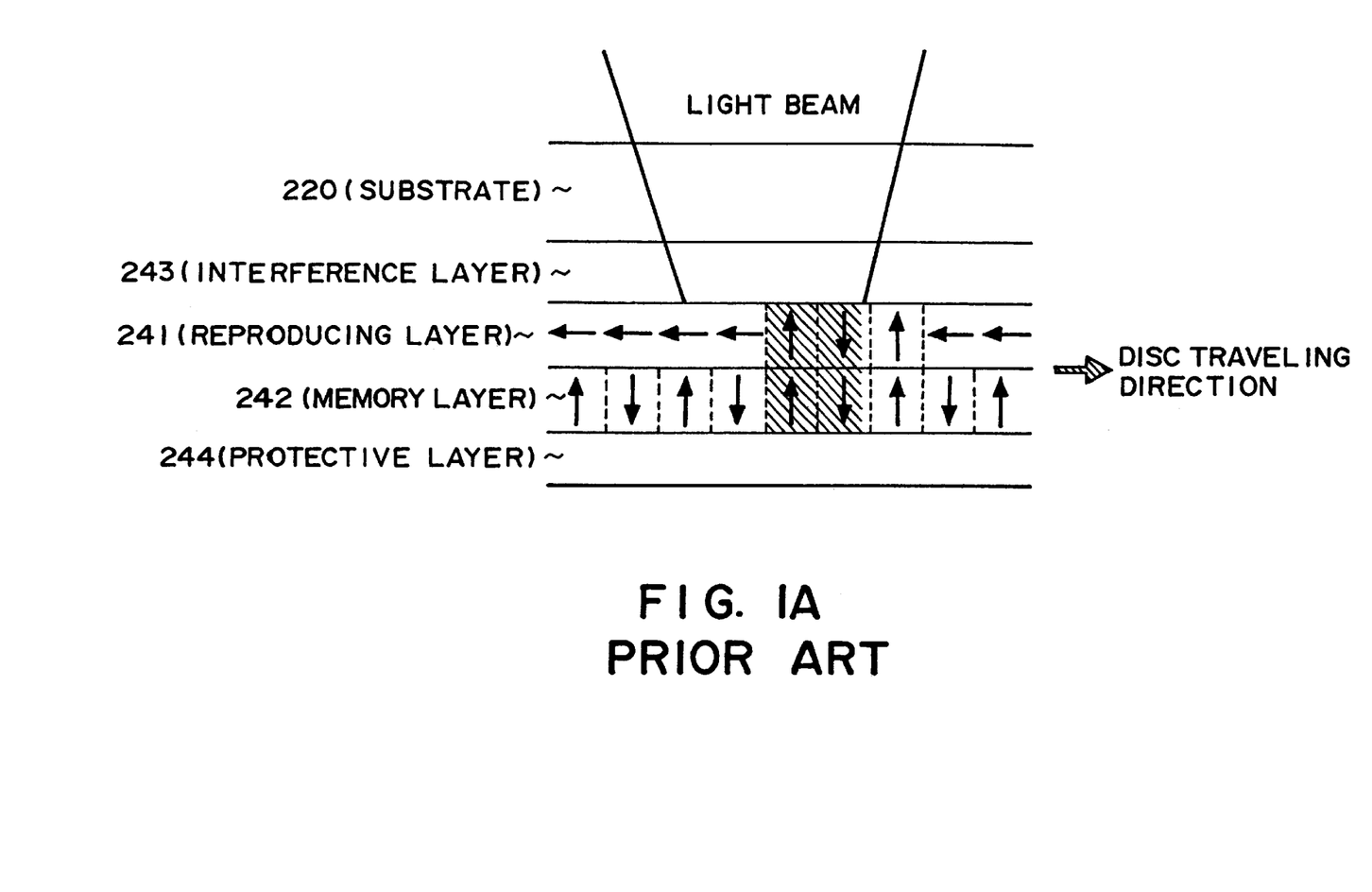
FIGS. 1A to 1C show an example of the super-resolving technique according to the prior art.
Figure 1B:
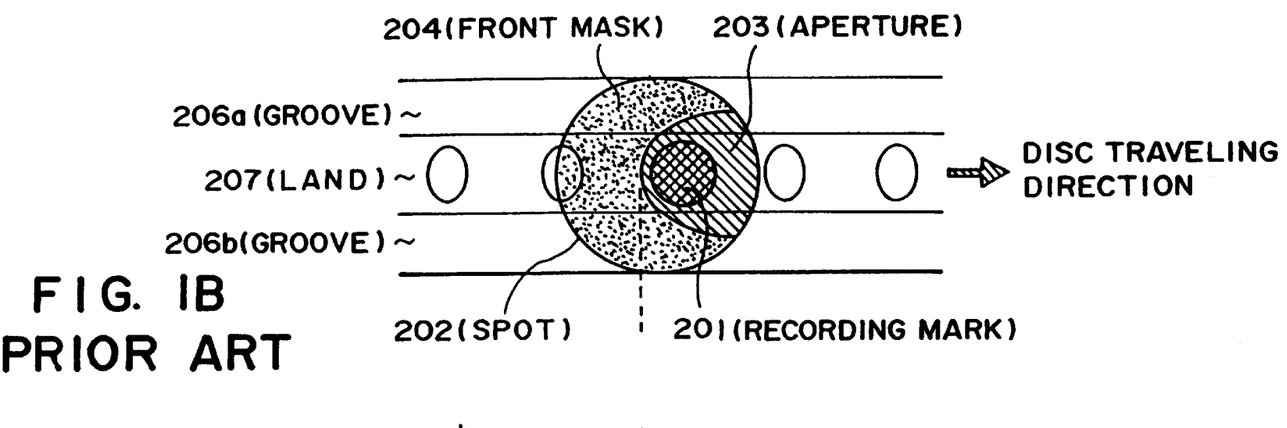
Figure 1C:
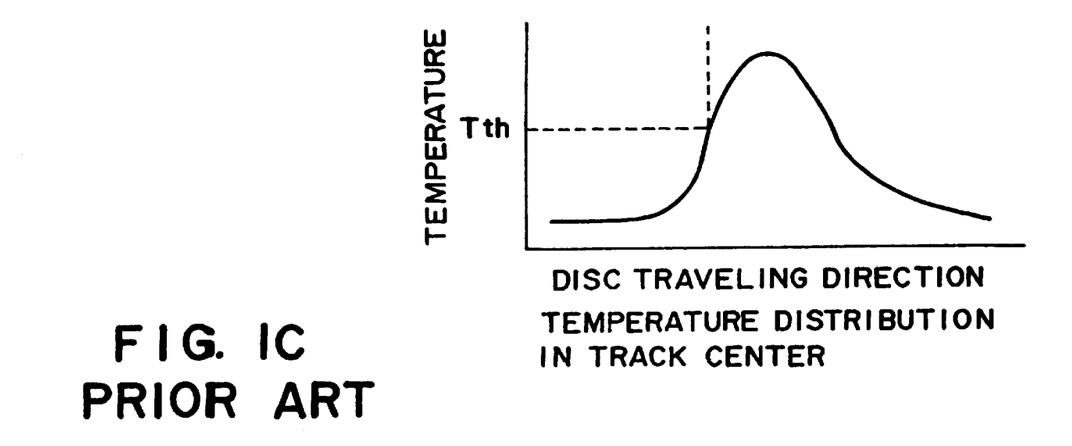
Figure 2:
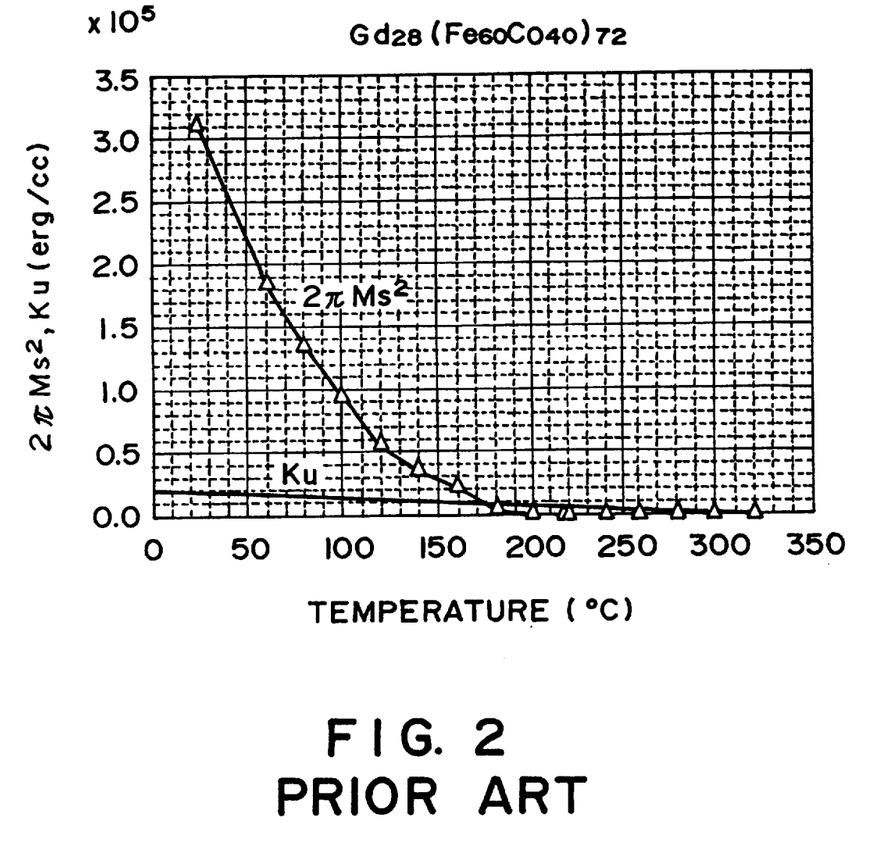
FIG. 2 is a graph showing the characteristic of a medium shown in FIGS. 1A to 1C.

For example, in a magneto-optical recording medium disclosed in Japanese Laid-Open Patent Application No. 6-124500, a medium construction as shown in FIGS. 1A to 1C of the accompanying drawings is proposed as a super-resolving technique for realizing recording density greater than the optical resolving power of reproducing light. FIG. 1A shows a cross-sectional view of an optical disc which is an example of the super-resolving technique. A substrate 220 is usually a transparent material such as glass or polycarbonate, and is formed in advance with concentric or spiral grooves (grooves 206) which form guide tracks. Recording information is recorded along a land and/or the grooves. On the substrate 220, there are successively formed an interference layer 243, a first magnetic layer (hereinafter referred to as the reproducing layer) 241, a second magnetic layer (hereinafter referred to as the memory layer) 242 and a protective layer 244. The interference layer 243 is used to enhance the Kerr effect, and the protective layer 244 is used to protect the magnetic layers. Arrows in the magnetic layers represent the directions of iron family element sub-lattice magnetization in the film. The memory layer 242 is, for example, film of TbFeCo, DyFeCo or the like which is great in vertical magnetic anisotropy, and recording information forms a magnetic domain depending on whether the magnetization of this layer is upward or downward relative to the surface of the film, and is held. The reproducing layer 241 is formed of a material of composition which is great in saturated magnetization Ms and small in vertical magnetic anisotropy and superior in rare earth element sub-lattice magnetization. FIG. 2 of the accompanying drawings shows an example of the static characteristic of the reproducing layer 241. At room temperature, this layer is an in-surface magnetized film, but with the rise of temperature, the saturated magnetization Ms gradually decreases and when a predetermined temperature is reached, the relation of magnitude between the vertical magnetic anisotropy Ku and $2\pi Ms^2$ is reversed and therefore, this layer becomes a vertically magnetized film. FIG. 2 shows the static characteristic in the single body of the reproducing layer, but when it is laminated with the memory layer 242, the exchange coupling force with the memory layer 242 works and therefore, the reproducing layer becomes a vertically magnetized film at a lower temperature Tth, and the direction of the iron family element sub-lattice magnetization of the reproducing layer 241 when it becomes vertically magnetized film becomes the direction in which it is exchange-coupled to the memory layer 242. When light for information reproduction is applied to the disc of such a medium construction from the substrate 220 side, the temperature gradient at the center of the data track becomes such as shown in FIG. 1C, and when this is viewed from the substrate 220 side, the isothermal line of Tth comes to exist in a spot as shown in FIG. 1B. Thereupon, as previously described, in the portion below Tth, the reproducing layer 241 becomes an in-surface magnetized film and therefore does not contribute to the polar Kerr effect (forms a front mark 204) and thus, the recording magnetic domain retained on the memory layer 242 becomes invisible by being masked. On the other hand, in the portion above Tth, the reproducing layer 241 becomes a vertically magnetized film and the direction of the iron family element sub-lattice magnetization becomes the same direction as the recording information by the exchange coupling from the memory layer 242. As a result, the recording magnetic domain of the memory layer 242 is transferred to only the portion of an aperture 103 which is small as compared with the size of a spot 202 and therefore, super-resolution is realized.

Figure 3A:
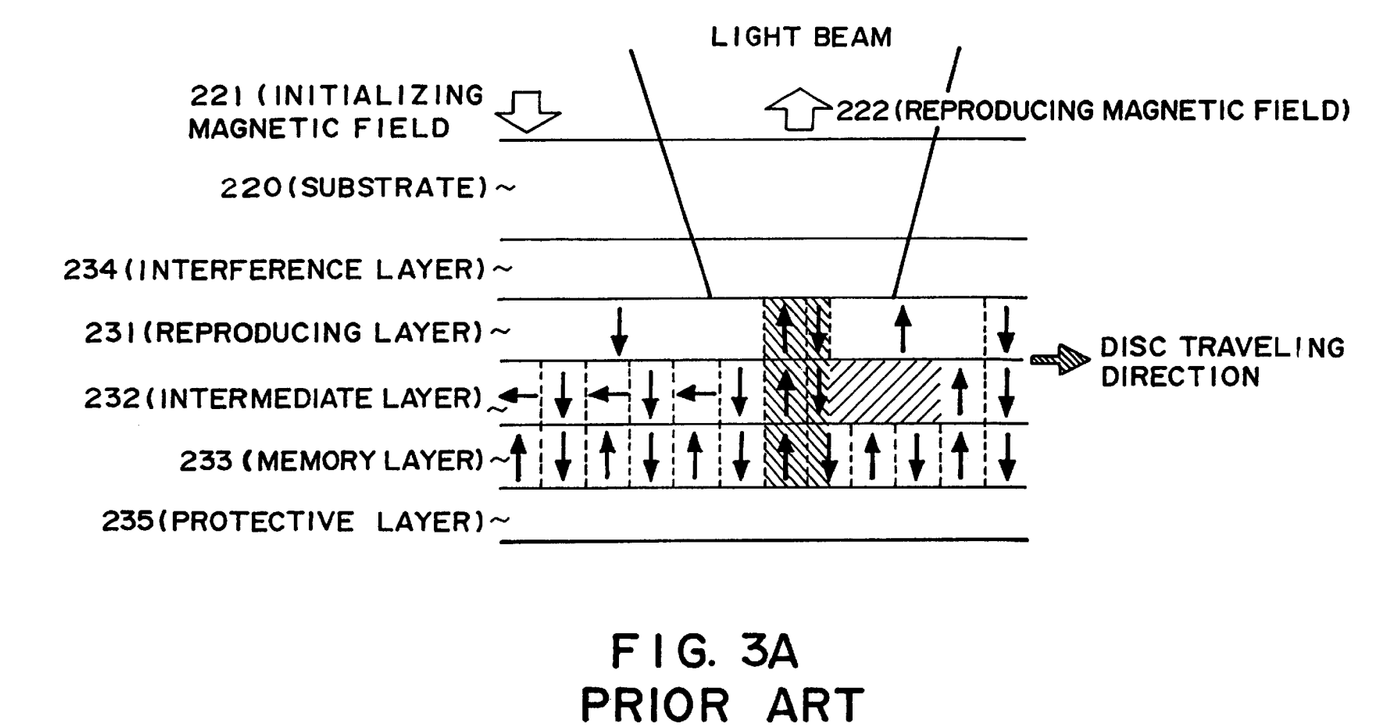
FIGS. 3A to 3C show another example of the super-resolving technique according to the prior art.
Figure 3B:
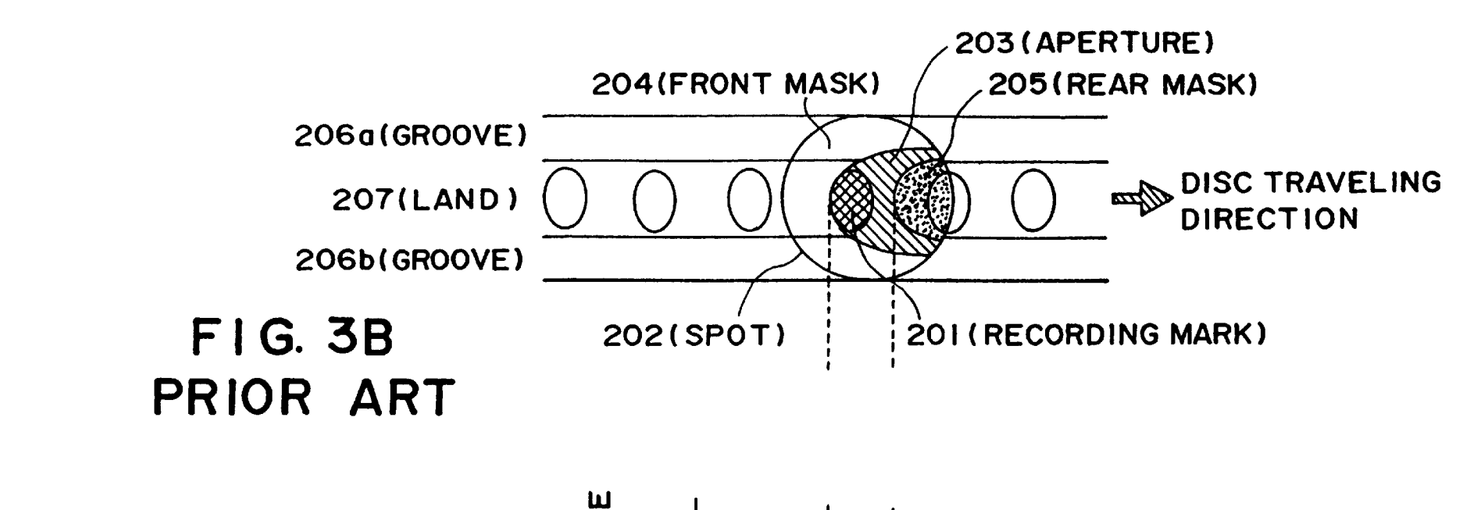
Figure 3C:
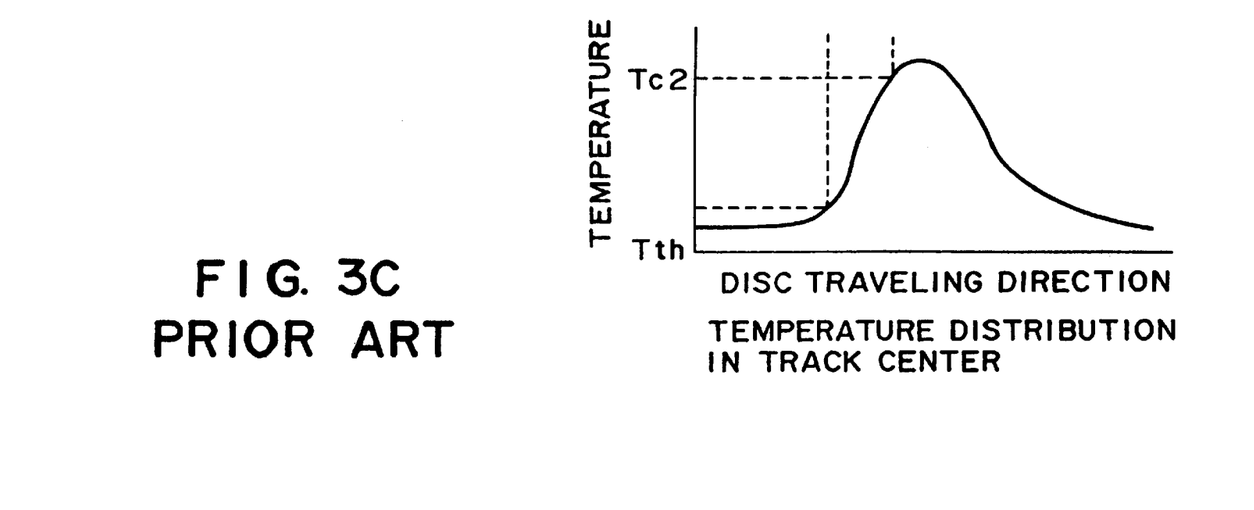

Also, in super-resolution reproducing methods disclosed in Japanese Laid-Open Patent Application No. 3-93058 and Japanese Laid-Open Patent Application No. 4-255946, use is made of a medium comprising a reproducing layer 231, a third magnetic layer (hereinafter referred to as the intermediate layer) 232 and a memory layer 233, as shown in FIGS. 3A to 3C of the accompanying drawings. Prior to the reproduction of information, the directions of magnetization of the reproducing layer 231 are aligned in one direction by an initializing magnetic field 221 and the magnetic domain information of the memory layer 233 is masked, whereafter a light spot 202 is applied and in a low temperature area in the temperature distribution of the medium created at that time, the initialized state is maintained by the reproducing layer 231 (a front mask 204 is formed) and in the high temperature area of the intermediate layer 232 above the Curie temperature Tc2, the reproducing layer 231 is forcibly oriented in the direction of a reproducing magnetic field 222 (a rear mask 205 is formed) and the actually effective size of the reproducing spot is made small so that only in the medium temperature area, the magnetized domain information of the memory layer 233 may be transferred, whereby a recording mask 201 below the diffraction limit of light is made reproducible to thereby improve line density.

Since in these conventional super-resolving systems, the front mask 204 in the low temperature area extends in the direction of the adjacent track, an attempt is made to improve line recording density and at the same time, track density.

However, in the reproducing method using the above-described super-resolution reproducing technique, the line recording density of information is greatly improved, but no consideration has been paid to tracking during the recording and reproduction of information and therefore, the improvement in information track recording density has been not sufficient. That is, when tracking is to be effected with a tracking guide groove comprising a continuous groove being provided in an optical recording medium, a track pitch of the order of λ/N.A. is usually used to effect stable tracking control, but if the track pitch is narrowed to increase track recording density, tracking error signals will decrease and tracking control will become remarkably difficult and therefore, it has been difficult to greatly enhance the track recording density.

Also, for example, Japanese Laid-Open Patent Application No. 3-93058 discloses a method of recording information on both of a land and a groove in order to improve information track recording density, but in this method, the quantity of reflected light in the groove portion is small as compared with the quantity of reflected light on the land portion, and this has led to the disadvantage that it is difficult to obtain a high S/N ratio in the groove portion and it is impossible to achieve track recording density exceeding two times that obtained by the ordinary method of recording on the land portion. Accordingly, the prior-art optical information recording method has been limited in the improvement in track recording density and has not been able to sufficiently make the most of the capability of a super-resolution information recording medium.

SUMMARY OF THE INVENTION

So, it is the object of the present invention to solve such problems and to provide an optical recording medium which enables the capability of a super-resolution optical recording medium to be fully displayed and can thereby greatly improve the recording density of information, and a method of optically recording and reproducing on such a medium.

The above object is achieved by an optical recording medium provided with a substrate formed with a groove portion and a land portion, and an optical recording layer laminated on the substrate, the widths of the land portion and the width of the groove portion being made to differ from each other.

Also, the above object is achieved by an information recording method of recording information on an optical recording medium, wherein the land portion of the recording medium is divided into a plurality of information tracks and information is independently recorded on each of the information tracks.

Also, the above object is achieved by an information reproducing method of reproducing information from an optical recording medium by the use of the super-resolving technique, wherein the land portion of the recording medium is divided into a plurality of information tracks and information is independently reproduced from each of the information tracks.

The invention will hereinafter be described in detail with respect to some embodiments thereof shown in the accompanying drawings.

DESCRIPTION OF THE PREFERRED EMBODIMENTS

[First Embodiment]

Figure 4:
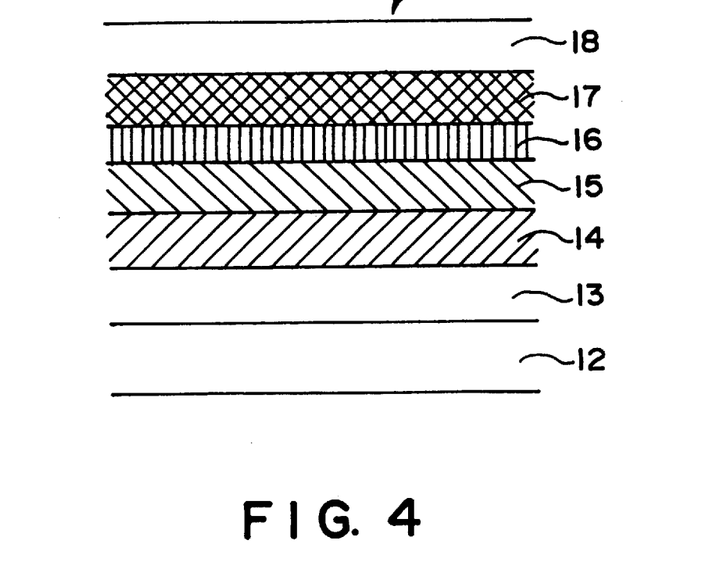
FIG. 4 shows an example of the layer construction of a medium used in the present invention.

A first embodiment of the present invention will hereinafter be described in detail with reference to the drawings. A description will first be provided of an example of an optical recording medium capable of super-resolution reproduction which is used in the optical recording and reproducing method of the present invention. The layer construction of the recording medium used in this embodiment is the same as that described in the aforementioned Japanese Laid-Open Patent Application No. 3-93058. FIG. 4 shows the cross-sectional structure of a magneto-optical disc capable of super-resolution reproduction.

In FIG. 4, reference numeral 12 designates a disc-like transparent substrate formed of glass, plastic or the like, and a dielectric material layer 13, a first reproducing layer 14, a second reproducing layer 15, an intermediate layer 16, a second holding layer 17 and a dielectric material layer 18 are successively laminated on the transparent substrate 12. The first reproducing layer 14 is vertically magnetized film with a high Curie temperature and having a great Kerr rotation angle and a small coercive force, and is formed of GdFeCo (film thickness 300 Å). The second reproducing layer 15 may preferably be great in vertical magnetic anisotropy with a low Curie temperature and have a coercive force of several kilooersteds at room temperature and therefore is formed of TbFe (film thickness 200 Å). The intermediate layer 16 is a layer for adjusting the exchange coupling force between the second reproducing layer 15 and the record holding layer 17 and is formed of GdFeCo (film thickness 100 Å). The record holding layer 17 needs to be great in vertical magnetic anisotropy with a greater Curie temperature and coercive force than the second reproducing layer 15 and therefore is formed of TbFeCo (film thickness 300 Å), and this record holding layer 17 has its Curie temperature and coercive force set to 230° C. and 15 kilooersteds or greater, respectively. Further, the dielectric material layers 13 and 18 are formed of silicon nitride.

Figure 5:
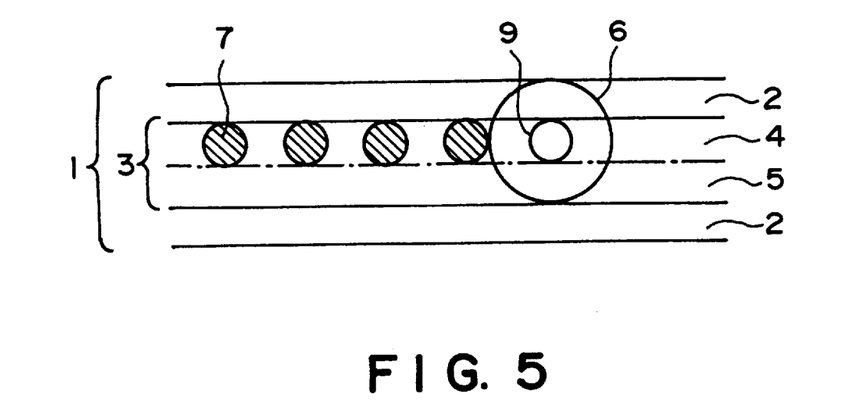
FIG. 5 illustrates an information recording method according to a first embodiment of the present invention.

FIG. 5 is a view for illustrating an embodiment of the optical recording and reproducing method of the present invention. In FIG. 5, reference numeral 2 denotes groove portions used as the guide for tracking control, and in the present embodiment, the pitch of the groove portions 2 is 1.6 $\mu$m and the width of the groove portions 2 is 0.5 $\mu$m. A land portion 3 for recording information is provided between these groove portions 2. The width of the land portion 3 is 1.1 $\mu$m, and when information is to be recorded, as will be described later in detail, the land portion 3 is divided into a first information track 4 and a second information track 5, and information is recorded selectively and independently on each information track.

Figure 8:
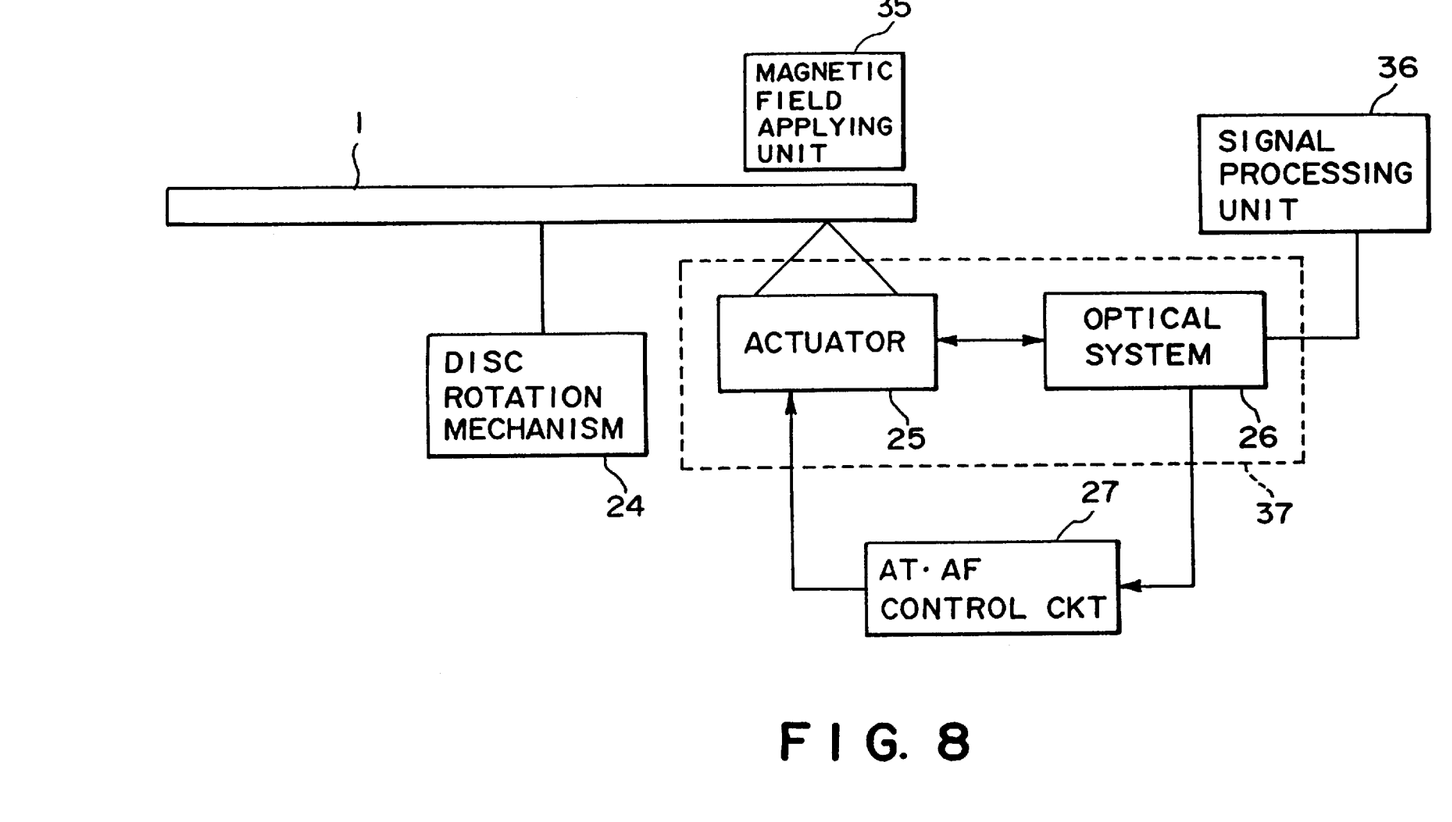
FIG. 8 shows a driving apparatus used in the present invention.

FIG. 8 is a diagram for illustrating an embodiment of a driving apparatus used in the optical recording and reproducing method of the present invention. The driving apparatus is provided with a signal processing unit 36 for effecting signal processing such as the modulation and demodulation of data, a disc rotation mechanism 24 for rotatively driving a magneto-optical disc 1, a magnetic field applying unit 35, an optical head 37 including an actuator 25 and an optical system 26, and an AT and AF control circuit 27 for controlling the driving of the actuator 25. In the optical system 26, there are provided a semiconductor laser which is a light source, an objective lens for stopping down the laser beam thereof into a micro light spot, a sensor for detecting the reflected light from the magneto-optical disc 1, etc. The actuator 25 comprises a focus actuator for moving the objective lens in the optical system 26 in the focus direction thereof, and a tracking actuator for moving the objective lens in the tracking direction. On the basis of an AF error signal and an AT error signal detected by the optical system 26, the focus actuator and the tracking actuator are driven by the AT and AF control circuit 27, whereby focus control and tracking control are effected. Further, the AT and AF control circuit 27 is provided with a mechanism for controlling AT offset by an information track selecting signal and scanning a desired information track.

Figure 9:
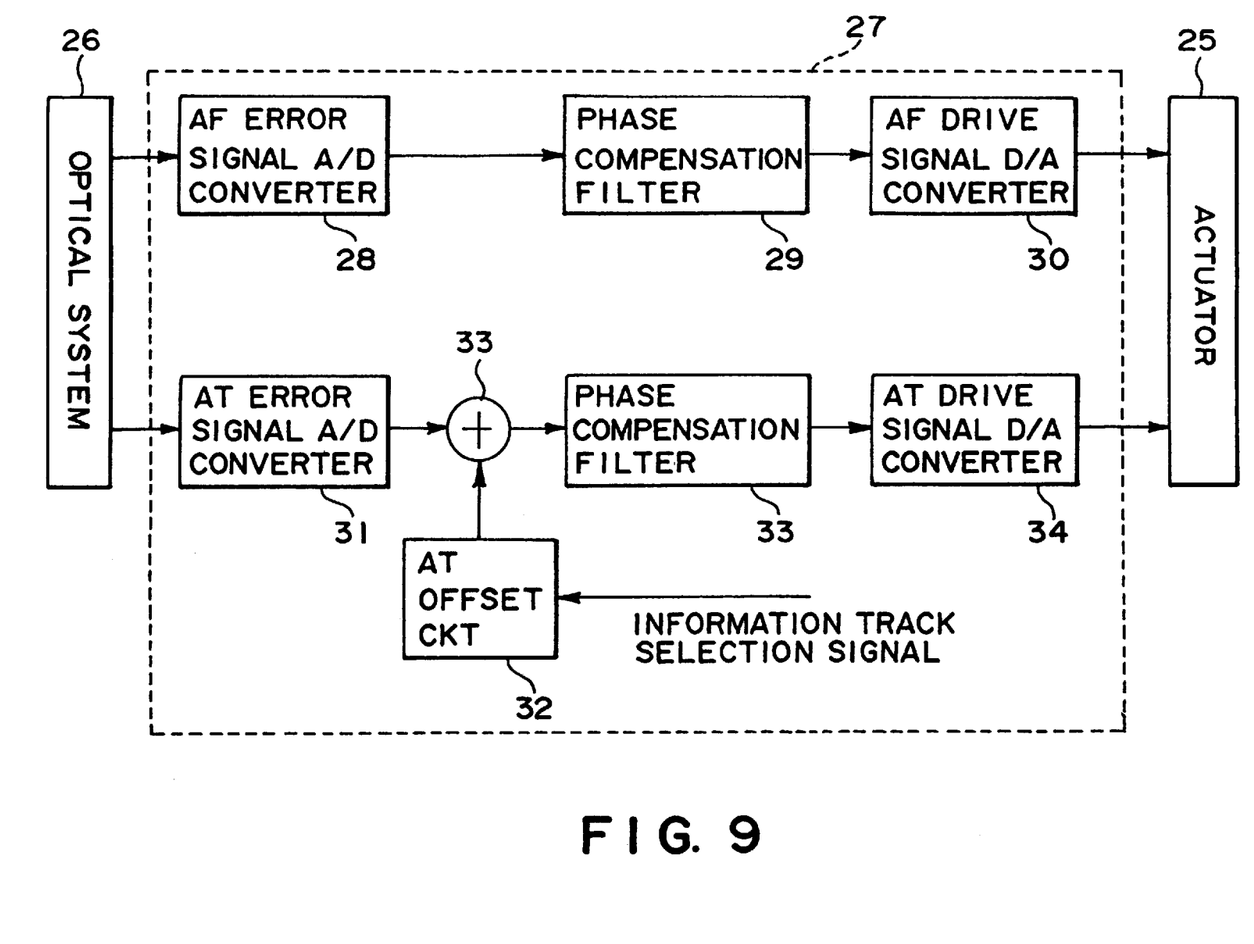
FIG. 9 shows the details of the AT and AF control circuit 27 of FIG. 8.

FIG. 9 is a diagram showing the construction of the AT and AF control circuit 27 in detail. Focus control is effected so that the AF error signal detected by the optical system 26 may be A/D-converted, whereafter phase compensation processing may be effected by a phase compensation filter 29 and the signal may be returned to an analog signal of proper gain by an AF drive signal D/A converter 30, whereafter the analog signal may be inputted to the actuator to drive the actuator, whereby the light spot may be focused on the surface of the disc. Tracking control is effected so that the AT error signal detected by the optical system 26 may be A/D-converted, whereafter an AT offset may be applied on the basis of the information track selecting signal, whereafter phase compensation processing may be effected by a phase compensation filter 33 and the signal may be returned to an analog signal of proper gain by an AT drive signal D/A converter 34, whereafter the analog signal may be inputted to the actuator to drive the actuator, whereby the light spot may follow the information tracks.

A description will now be provided of an information recording method using the above-described medium and driving apparatus. When information is to be recorded, tracking is offset to thereby effect the alignment of a laser spot 6 emitted from a semiconductor laser (not shown) which is a light source so that the laser spot 6 may scan a desired information track in the land portion 3 of FIG. 5. That is, an offset is applied to the tracking error signal of the AT and AF control circuit 27 of FIG. 8, whereby the selection of an information track is effected so that the laser spot 6 may deviate from the center and scan the desired information track, instead of scanning the center of the land portion 3. When information is to be recorded, for example, on a first information track 4, the laser spot 6 is offset by 0.225 $\mu$m toward the inner peripheral side from the center of the land portion 3 of the magneto-optical disc 1, as shown in FIG. 5. In this state, the laser beam 6 scans on the first information track 4, whereby the recording of the information is effected.

In the present embodiment, as information recording conditions, it is to be understood that the recording of a signal is effected by an optical modulation system by the use of a laser beam of a wavelength 780 nm and that the numerical aperture of the objective lens for stopping down the laser beam is 0.55 and the line speed of recording is 9 m/s. Also, a signal to be recorded on the first information track 4 is a recording signal having a mark length 0.4 $\mu$m and a mark position interval 0.8 $\mu$m (recording frequency 11.25 MHz). A signal to be recorded on a second information track 5 is a recording signal having a mark length 0.4 $\mu$m and a mark position interval 1.2 $\mu$m (recording frequency 7.5 MHz). When under such conditions, the laser spot 6 is made to scan on the second information track 4, a recording mark 7 of a signal of a frequency 7.5 MHz is recorded as shown in FIG. 5. A part of the laser spot 6 is also applied onto the adjacent second information track 5, but the intensity in that portion of the laser spot which is off the central portion is much weaker than that in the central portion and therefore no information is written there into.

Next, when a signal is to be recorded on the first information track 4, the recording of information is effected with the laser spot 6 offset by 0.225 $\mu$m toward the inner peripheral side from the center of the land portion 3. It is to be understood here that the recorded signal has a mark length 0.4 $\mu$m and a mark position interval 0.8 $\mu$m (recording frequency 11.25 MHz is effected under the same conditions as those previously described, and as a result, a recording mark 7 of a signal of a frequency 11.25 MHz is recorded on the first information track 4'. A recording mark 9 represents a recording mark being recorded by the laser spot 6.

Figure 6:
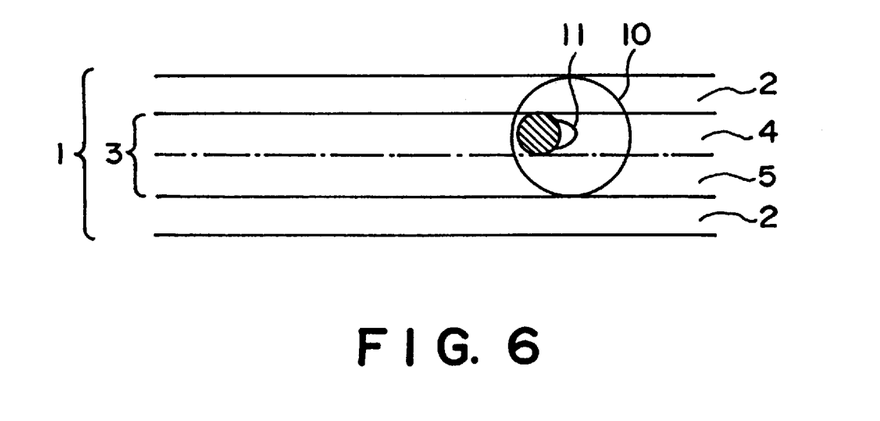
FIG. 6 illustrates an information reproducing method according to the first embodiment of the present invention.

When the signal thus recorded is to be reproduced, a laser spot 10 for reproduction is made to scan on a desired information track as shown in FIG. 6, and the reflected light from the surface of the medium at this time is detected by an optical sensor (not shown) and the recorded information is reproduced on the basis of a detection signal thus obtained. To make the laser spot 10 for reproduction scan on the desired information track, the laser spot 10 is offset by a technique similar to that during recording. When for example, the first information track 4 is to be reproduced, the laser spot 10 is offset by 0.225 $\mu$m toward the inner peripheral side as shown in FIG. 6. Then, the laser spot 10 for reproduction is made to scan on the first information track 4' e.g. at a reproduction power of 3.5 mW and line speed of 9 m/s, whereby the information is reproduced from the detection signal of the optical sensor at this time. In FIG. 6, reference numeral 11 designates an area in which the recording mark recorded on the record holding layer 17 is transferred to the first reproducing layer 14 and the second reproducing layer 15 by the temperature rise by the laser spot 10 for reproduction, and by the recording mark being thus transferred to the first and second reproducing layers 14 and 15, super-resolution reproduction is effected. When the second information track 5 is to be reproduced, the laser spot 10 for reproduction is offset by 0.225 µm toward the outer peripheral side and the reproduction of information is likewise effected.

When the inventor performed recording of signal and reproduction thereof in accordance with the above method, a good result could be obtained. That is, as shown in FIG. 5, a signal of a frequency 11.25 MHz was recorded on the first information track 4 and a signal of a frequency 7.5 MHz was recorded on the second information track 5. A laser spot of reproducing power 3.5 mW was made to scan on each of these information tracks at a line speed 9 m/s, and when the obtained reproduction signals were observed by means of a spectrum analyzer, a signal of 11.25 MHz was observed on the first information track 4 and CNR of 46 dB was obtained. At this time, a signal component of 7.5 MHz on the second information track 5 was not observed at all. Also, when under the same conditions, the laser spot 10 for reproduction was offset and the second information track 5 was reproduced, a signal of 7.5 MHz was observed and CNR of 49 dB was obtained. At this time, a signal component of 11.25 MHz on the first information track 4 was not observed at all. Thus, it could be confirmed that even if the land portion of a width 1.1 µm was divided into two information tracks, information could be recorded and reproduced well.

Figure 7:
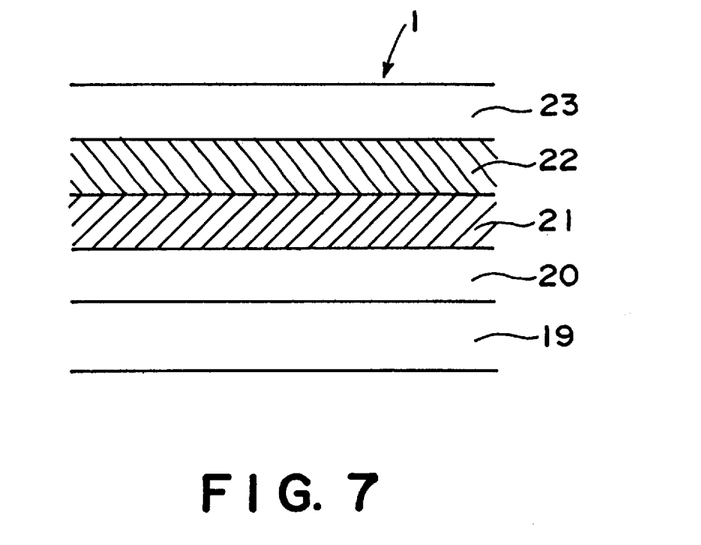
FIG. 7 shows another example of the layer construction of the medium used in the present invention.

The layer construction used in the optical recording medium of the present invention is not limited to that of FIG. 4, but use may be made of a magneto-optical disc provided with a reproducing layer as described in Japanese Laid-Open Patent Application No. 6-124500 wherein magnetization exhibiting vertical magnetization only in an area increased in temperature to a certain temperature area by the application of a laser beam for reproduction and recorded on a second holding layer is transferred to a reproducing layer and in the other area than that, the magnetization of the reproducing layer faces the inside of the surface and works as a mask for a signal recorded on the second holding layer. FIG. 7 shows the cross-sectional structure of this magneto-optical disc. In FIG. 7, silicon nitride (800 Å) as a dielectric material layer 20, GdFeCo (400 Å) as a reproducing layer 21, DyFeCo (200 Å) as a record holding layer 22 and silicon nitride (500 Å) as a dielectric material layer 23 are successively laminated on a transparent substrate 19.

The inventor did the evaluation experiment of a reproducing signal as in the previous embodiment by the use of the magneto-optical disc as described above. That is, the land portion 3 of 1.1 µm was divided into two information tracks, a signal of 11.25 MHz and a signal of 7.5 MHz were recorded on the first information track 4 and the second information track 5, respectively, the first and second information tracks were reproduced under the same reproducing conditions as those in the previous embodiment and the reproduction signals were observed by means of a spectrum analyzer. The result of the experiment was such that on the first information track, CNR of 43 dB was obtained by the signal of 11.25 MHz and on the second information track, CNR of 46 dB was obtained by the signal of 7.5 MHz. CNR was somewhat lower than in the previous embodiment, but the cross talk of the signal from the adjacent information track was not observed at all.

[Second Embodiment]

Figure 10:
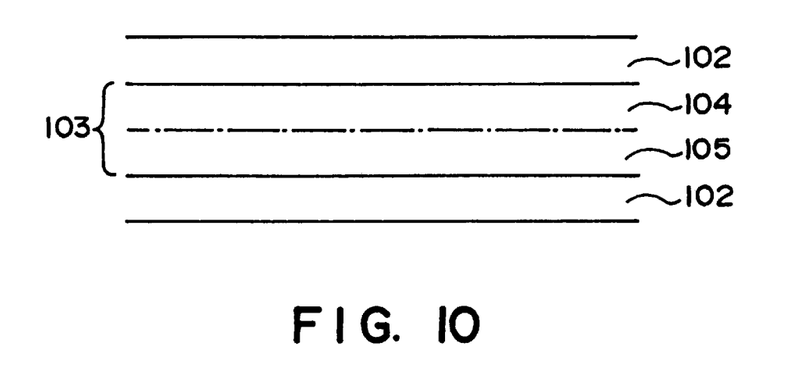
FIG. 10 is a plan view showing the construction of the information tracks of the medium used in the present invention.

A second embodiment of the present invention will now be described with reference to the drawings. FIG. 10 is a plan view showing the construction of the information tracks of the optical recording medium of the present invention. The construction of the optical recording medium used in the second embodiment is the same as that used in the afore described first embodiment.

In FIG. 10, a land portion 103 on which information is recorded (written) is comprised of a first information recording track 104 and a second information recording track 105, and its width is 1.1 µm. Two groove portions 102 are formed so as to sandwich the land portion 103 therebetween, and in the present embodiment, the pitch and width thereof are 1.6 µm and 0.5 µm, respectively. Although not shown in FIG. 10, the land portion 103 and groove portions 102 are spirally formed on the circular optical recording medium from the outer periphery toward the inner periphery thereof, and since the groove portions 102 are used in common to the adjacent land portion 103, the groove portions 102 and land portions 103 are alternately formed on the transparent substrate of the optical recording medium which will be described later.

Figure 13:
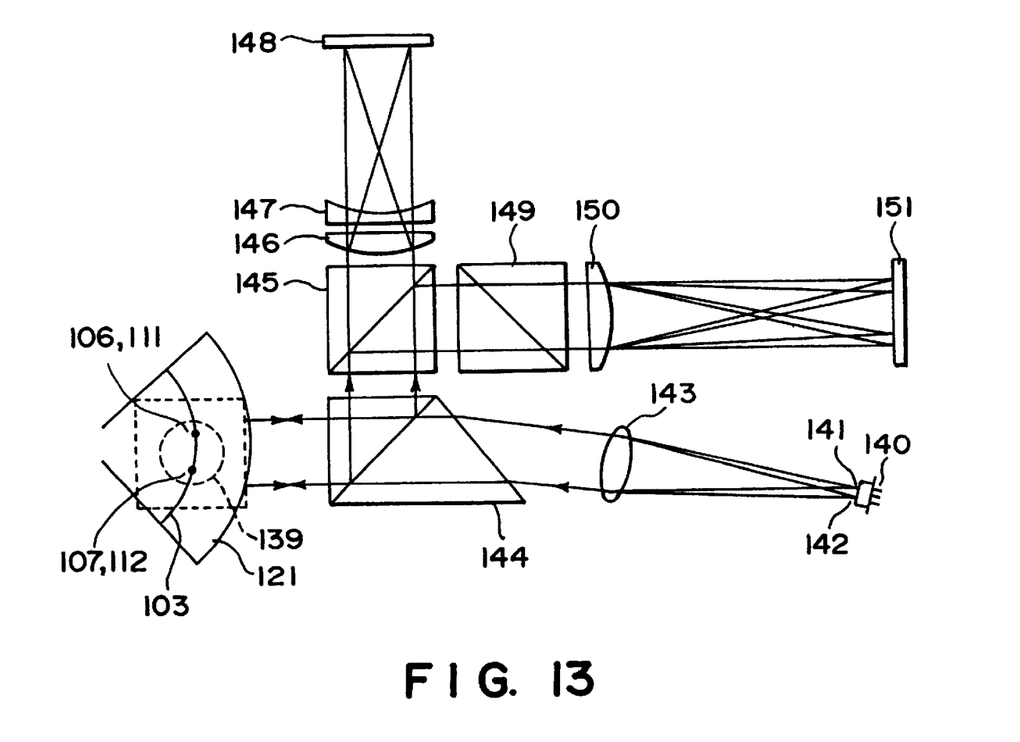
FIG. 13 shows the optical system of a driving apparatus used in the second embodiment.

FIG. 13 shows an example of the optical system of a driving apparatus used in the information reproducing method of the present invention. In FIG. 13, laser beams emitted from two light emitting points 141 and 142 on a monolithic semiconductor laser 140 are applied as a first light spot 106 or 111 and a second light spot 107 or 112 onto the land portion 103 of the optical recording medium 121 by an objective lens 139. The reflected light from the optical recording medium 121 has its optical path bent by a beam splitter 144 with a beam shaping portion, whereafter it is divided into a light beam for servo control and a light beam for signal reproduction by a beam splitter 145, and these light beams are detected by a servo sensor and an RF sensor, respectively.

A description will now be provided of information recording using the above-described optical system.

Figure 11:
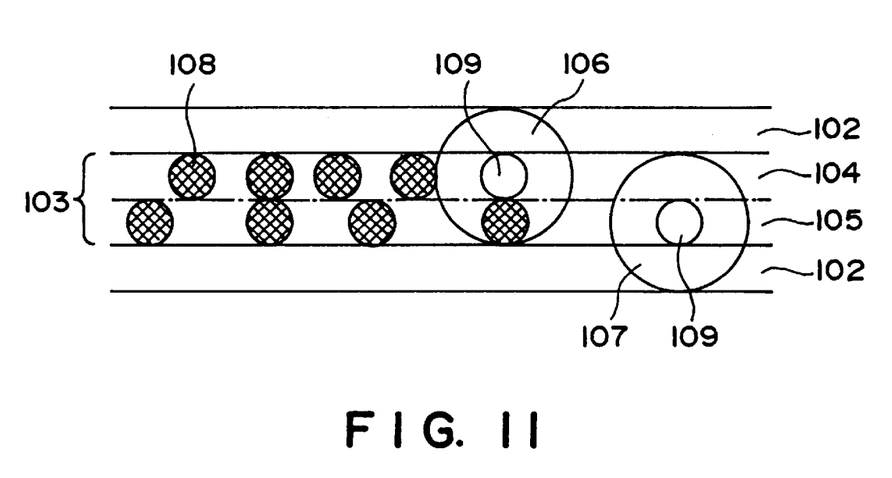
FIG. 11 illustrates an information recording method according to a second embodiment of the present invention.

During information recording, as shown in FIG. 11, the first recording laser beam 106 is applied from the transparent substrate 12 side to a position offset by 0.275 µm from the center of the land portion 103 toward the inner peripheral side thereof (the first information recording track 104) and the second recording laser beam 107 is applied from the transparent substrate 12 side to a position offset by 0.275 µm from the center of the land portion 103 toward the outer peripheral side (the second information recording track 105), whereby the recording of signals has been effected on the second holding layer 17 (see FIG. 4) by an optical modulation system. The wavelength of the recording layer beams 106 and 107 is 780 nm, the numerical aperture of the objective lens is 0.55, the line speed of recording is 9 m/s, the recording signal recorded by the first recording laser beam 106 has a mark length of 0.4 µm and a mark position interval of 0.8 µm, and the recording signal recorded by the second recording laser beam 107 has a mark length of 0.4 µm and a mark position interval of 1.5 µm. Also, in order that the first recording laser beam 106 and the second recording laser beam 107 may not cause thermal interference therebetween, it is preferable that the first recording laser beam 106 and the second recording laser beam 107 be spaced apart by at least λ/(N.A.) from each other. In the present embodiment, the first recording laser beam 106 and the second recording laser beam 107 are applied while being spaced apart by 15 µm from each other. Further, in order to cause the laser beam applied while being greatly offset from the center of the land portion 103 to stably follow the tracks, tracking control has been effected by utilization of a signal obtained by adding a tracking error signal obtained from the reflected light of the first recording laser beam 106 and a tracking error signal obtained from the reflected light of the second recording laser beam 107. In this manner, good tracking control could be effected even if the number of the information recording track was increased. A recording mark 108 represents a mark indicative of the recording of information having been completed, and a recording mark 109 represents a mark indicative of the recording of information going on.

Figure 12:
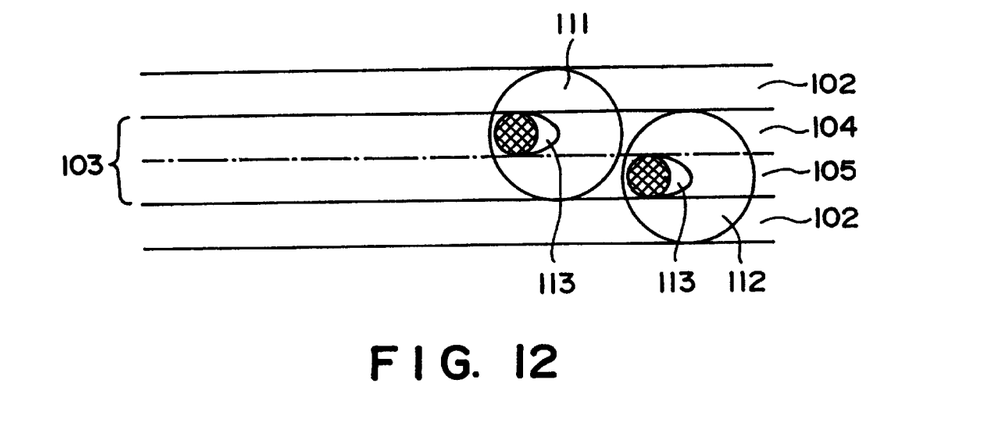
FIG. 12 illustrates an information reproducing method according to the second embodiment of the present invention.

When for the thus recorded signals, as shown in FIG. 12, a first reproducing laser beam 111 of a line speed 9 m/s and reproducing power 3.5 mW and a second reproducing laser beam 112 are applied from the transparent substrate 12 side onto the first information recording track 104 and the second information recording track 105, respectively, the recording mark recorded on the record holding layer 17 is transferred to the first reproducing layer 14 and the second reproducing layer 15 and only the temperature-increased regions of the first reproducing layer 14 and the second reproducing layer 15 come to exhibit a magneto-optical effect and therefore, the information recorded on the record holding layer 17 is reproduced on the basis of the reflected light from these regions. A transfer area 113 is an area in which the recording mark 108 recorded on the record holding layer 17 is transferred to the first reproducing layer and the second reproducing layer by the temperature rise by the reproducing laser beams. At this time, CNR (carrier to noise ratio) of 46 dB has been obtained from the reproduction signal of the first information recording track 104 and CNR of 48 dB has been obtained from the reproduction signal of the second information recording track 105. Also, the cross talk from the second information recording track 105 to the first information recording track 104 and the crosstalk from the first information recording track 104 to the second information recording track 105 have both been 20 dB or less. As during information recording, tracking control has been effected by utilization of a signal obtained by adding a tracking error signal obtained from the reflected light of the first reproducing laser beam 111 and a tracking error signal obtained from the reflected light of the second reproducing laser beam 112.

As described above, the first information recording track 104 and the second information recording track 105 are provided on the land portion 103 and light beams corresponding to the respective tracks are applied at a time to thereby effect recording and reproduction on the respective information recording tracks, whereby the number of the groove portions 102 can be decreased and the track recording density is improved and thus, the recording capacity can be greatly increased.

While in each of the above-described embodiments, two information recording tracks are provided on the land portion, the number of information recording tracks provided on the land portion is not limited to two, but a plurality of information recording tracks may be provided on the land portion and a plurality of light beams corresponding thereto may be applied at a time. Also, the tracking control at this time can be effected by the use of a tracking error signal obtained from the reflected light of a laser beam applied to the outermost two of the plurality of information recording tracks provided on the land portion.

Also, while each of the embodiments has been described by the use of a magneto-optical recording medium, the medium applicable to the present invention is not limited to a magneto-optical recording medium, but may be a phase-variable recording medium. The super-resolving technique of the phase-variable recording medium is disclosed, for example, in U.S. Pat. No. 5,153,873. In U.S. Pat. No. 5,153,873, as a medium to which the super-resolving technique is applicable, there is disclosed a medium including a layer of a phase-variable material for accumulating information therein and a layer for masking the information of a recording layer formed of a non-linear optical material.

What is claimed is:

1. An information recording method for recording on an optical recording medium in which groove portions and land portions are alternately arranged and each land portion sandwiched between groove portions is divided into a plurality of information tracks, said method comprising the steps of:

recording information independently on the respective information tracks by a single light beam; and changing the information tracks on which recording is effected in each land portion by applying an offset to tracking control of the light beam.

2. An information reproducing method for reproducing information, by the use of a super-resolving technique, from an optical recording medium in which groove portions and land portions are alternately arranged and each land portion sandwiched between groove portions is divided into a plurality of information tracks, said method comprising the steps of:

reproducing information independently from the respective information tracks by a single light beam; and changing the information tracks from which reproduction is effected in each land portion by applying an offset to tracking control of the light beam.

* * * * *

UNITED STATES PATENT AND TRADEMARK OFFICE
CERTIFICATE OF CORRECTION

PATENT NO. : 5,818,811
DATED : October 6, 1998
INVENTOR(S) : Eiichi Fujii

It is certified that error appears in the above-identified patent and that said Letters Patent is hereby corrected as shown below:

Title page, item [56], under Foreign Documents insert the following:

```
Sept.  8, 1994 [JP] Japan.................6-214925
Nov.  24, 1994 [JP] Japan.................6-291309
Sept.  6, 1995 [JP] Japan.................7-228837
```

Signed and Sealed this

Twenty-third Day of February, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,818,811

DATED : October 6, 1998

INVENTOR(S): EIICHI FUJII

Page 1 of 2

It is certified that error appears in the above-identified patent and that said Letters Patent is hereby corrected as shown below: On the title page,

```
Insert --[30] Foreign Application Priority Data
Sept. 8, 1994    [JP]    Japan         6-214925
Nov. 25, 1994    [JP]    Japan         6-291309
Sept. 6, 1995    [JP]    Japan         7-228837--.
```

COLUMN 6:

```
    Line 14, "as" should read --as for--;
    Line 33, "there into." should read --thereinto.--;
    Line 43, "track 4'." should read --track 4).--; and
    Line 57, "track 4'" should read --track 4,--.
```

COLUMN 7:

```
    Line 66, "afore" should read --afore- --.
```

UNITED STATES PATENT AND TRADEMARK OFFICE
CERTIFICATE OF CORRECTION

PATENT NO. : 5,818,811

DATED : October 8, 1998

INVENTOR(S) : EIICHI FUJII

It is certified that error appears in the above-identified patent and that said Letters Patent is hereby corrected as shown below:

COLUMN 9:

Line 25, "cross talk" should read --crosstalk--.

Signed and Sealed this

Twenty-second Day of June, 1999

Attest:

Q. TODD DICKINSON

*Attesting Officer*     *Acting Commissioner of Patents and Trademarks*